Feb. 27, 1962 C. E. WRIGHT 3,022,575
TUBING CUTTER
Filed July 24, 1959 2 Sheets-Sheet 1

INVENTOR.
CLYDE E. WRIGHT
BY
ATTORNEY

Feb. 27, 1962   C. E. WRIGHT   3,022,575
TUBING CUTTER
Filed July 24, 1959   2 Sheets-Sheet 2
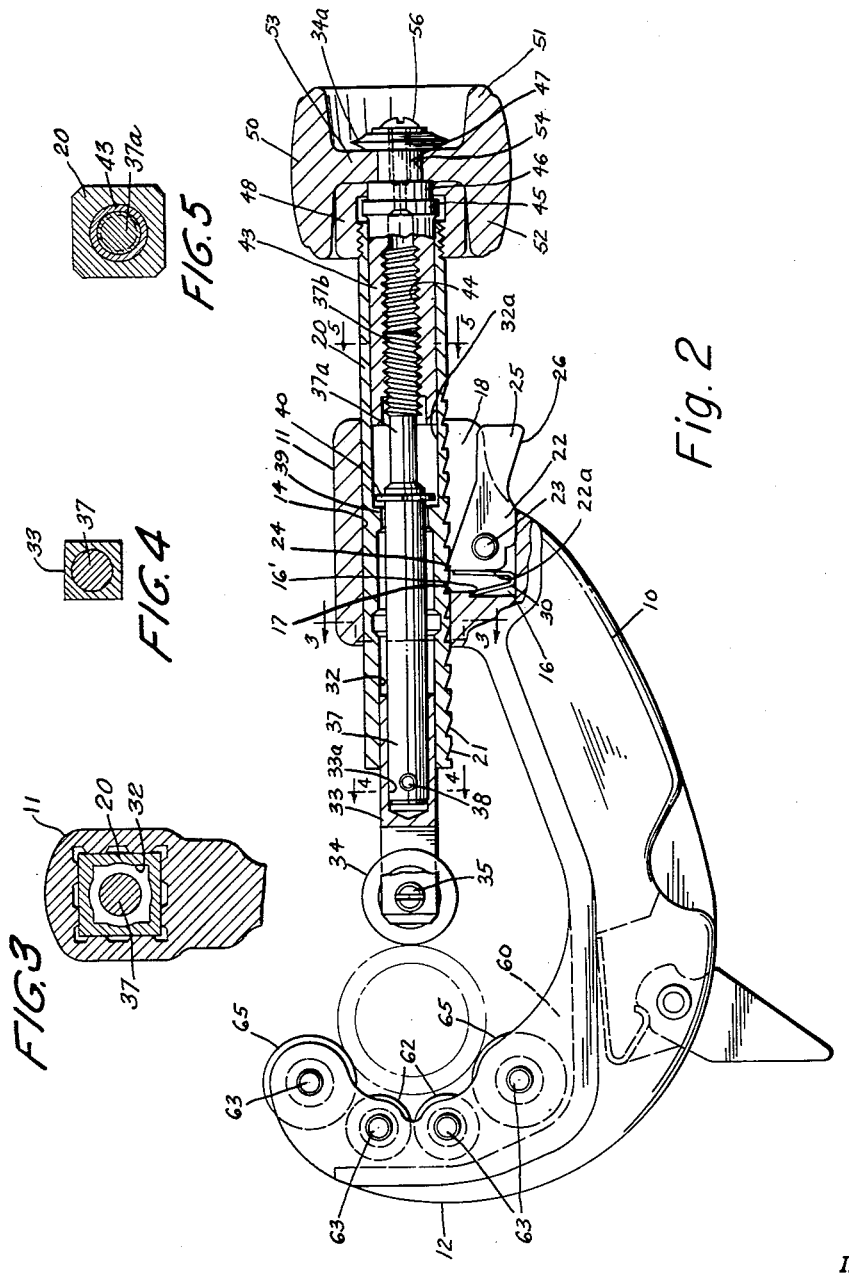
INVENTOR.
CLYDE E. WRIGHT
BY
His ATTORNEY

United States Patent Office 3,022,575
Patented Feb. 27, 1962

3,022,575
TUBING CUTTER
Clyde E. Wright, Elyria, Ohio, assignor to The Ridge Tool Company, Elyria, Ohio, a corporation of Ohio
Filed July 24, 1959, Ser. No. 829,361
3 Claims. (Cl. 30—102)

This invention relates to improvements in tubing cutters.

Heretofore one of the problems has been that the tubing cutter must be held by one hand and the cutter advancing means laboriously screwed in until the cutter was engaged with the tube. At the same time there was the problem of holding the tube in proper position which made it necessary to place the tube in a vise. The vise was apt to be tightened too tight, crushing or deforming the tube.

Furthermore in previous cutters there was a limitation on the size of tubes that could be cut. Cutters designed to cut small tubes were not good cutters for cutting large tubes and vice versa.

One of the objects of the invention is to provide a tubing cutter having an improved cutter advancing mechanism wherein the parts are all completely housed and protected from the deleterious effects of dust, dirt and chips.

Another object of the invention resides in the provision of a cutter mechanism which may be quickly and easily advanced into engagement with the tube to be cut and particularly where the control knob may be spun and thus move the cutter by inertia.

Another object of the invention is to provide a cutter wherein a wide variety of sizes of tubing may be cut and the cutter operates efficiently with small tube sizes as well as large tube sizes.

Another object of the invention resides in a cutter which may be advanced to the point of cutting engagement with the tube quickly and easily.

Still other objects of the invention and the invention itself will become more apparent from the following description of an embodiment thereof which description is illustrated by the accompanying drawings and forms a part of this specification.

In the drawings:

FIG. 2 is a view partly in elevation and partly in section; and

FIGS. 3, 4 and 5 are sections taken from the lines indicated by 3—3, 4—4 and 5—5 of FIG. 2.

Figure 1:
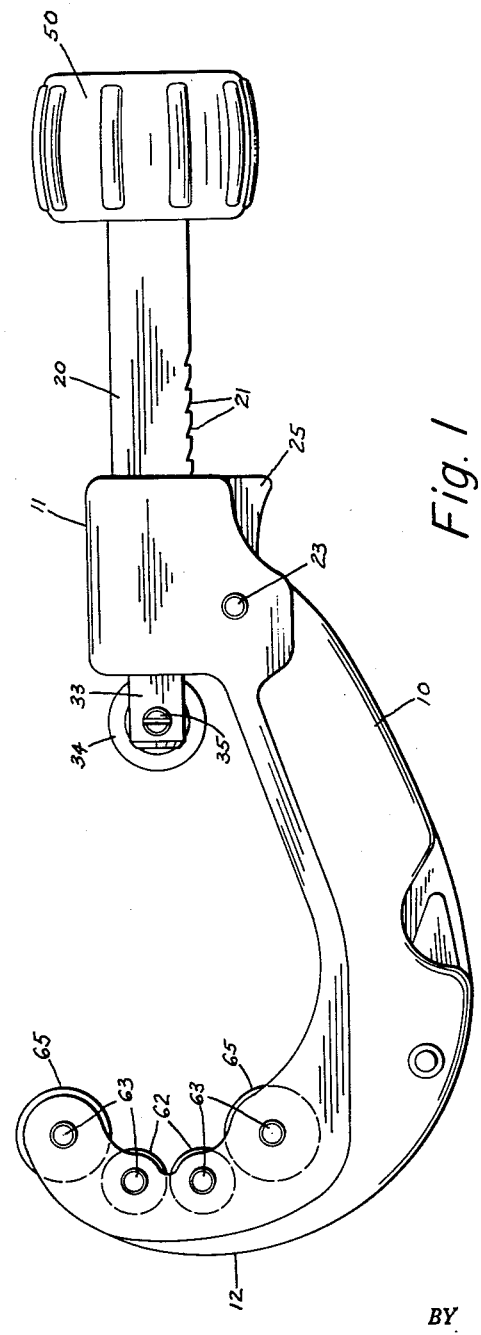
FIG. 1 is a side elevational view of the improved tubing cutter of my invention.

As best shown in the drawings, the device includes a generally C-shaped body 10, one end of which is provided with a hollow boss 11 and the other end 12 of which extends opposite to the boss.

The boss 11 is provided with a bore 14 which is of polygonal cross section. This bore may be rectangular or any other polygonal shape so that the cutter advancing mechanism will not rotate.

On one side of the boss, where it connects to the body 10, there is provided a recess 16 one side of which opens to the bore 14, at 17, and the other end 18 of which opens at right angles to the first opening along the side of the boss.

A hollow shaft 20, the exterior of which is provided with a shape complementary to that of the bore 14, is slidably disposed in the bore 14. The shaft 20 is provided with ratchet teeth 21 on the side toward the opening 17. A pawl 22 is pivotally supported in the recess 16 on a pin 23 and is provided with a ratchet tooth engaging part 24, which extends through the opening 17 where it may engage with the teeth 21. The pawl is provided with an operating handle 25 which extends outwardly through the opening 18 and is formed with a finger engaging part 26 on its outer edge. The pawl is held with the ratchet tooth enaging point 24 normally in engagement with the ratchet teeth 21 by a spring 30 which may be a U or V-shaped spring one end of which seats against the end wall of the recess 16, under a ledge 16', and the other end of which is in engagement with the flat end 22a of the pawl 22.

It will be noted that the operating part 26 of the pawl extends substantially parallel to the boss 11 alongside the boss and can therefore be engaged by the same hand that grips the operating handle, to withdraw the tooth engaging part from the ratchet teeth whereby the ratchet may be quickly released for sliding the shaft 20 outwardly.

The interior of the hollow shaft 20 is provided with a first bore 32 which may be of rectangular or polygonal cross section and in which a cutter wheel support 33 is slidably journalled. The end of the support is slotted and carries a cutter 34 rotatably mounted on a pin 35 which may be threaded into the support bridging the slot.

An operating stem 37 extends into a bore 33a of the cutter support, being pinned therein by a pin 38. The rectangular bore 32 terminates in an inwardly extending flange or annular partition 39. The operating stem 37 extends through the opening in the flange and is provided with a reduced diameter extension 37a having a threaded end 37b. A C-ring 40, secured in a groove in the shaft 37 adjacent the partition 39, holds the shaft from sliding outwardly in the bore.

A feed screw nut 43 is rotatably journalled in the bore 32a, which is circular in cross section and provides a bearing for the nut. The nut is provided with internal threads 44 for threaded engagement with the threaded end 37b of the stem 37. Outwardly of the shaft 20 the nut 43 is provided with a flange 45 adjacent which is a circular boss 46 of smaller diameter, and next to which is an extension 47 of still smaller diameter. The extension 47 may be square or fluted. The flange 45 is engaged by the interior of a cap 48 which is threaded on the end of the tube 20. The boss 46 has a bearing in an opening in the cap. The cap thus engages and takes the end thrust of the nut 43.

The inward travel of the nut 43 is resisted by a knob 50 which is generally barrel shaped and is provided with a pair of skirts 51 and 52 and a central partition 53. The central partition is provided with an aperture 54 which is complementary to the square extension 47 whereby it turns with the nut 43. The extension 47 is also slightly less in length than the width of the partition 53 so that when the knob is locked on the end, as it is by a screw 56 and spare cutter wheel 34a, the partition is locked between the cutter wheel and the boss 46. Thus the knob 50 and the boss 46 hold the nut against longitudinal movement in the shaft 20. The two skirts 51 and 52 on the knob are of sufficient length that the skirt 52 covers and hides the cap 48 and the other skirt 51 extends beyond the partition 53 to provide a pocket in which the spare cutter wheel, which acts as a washer, and its retaining screw is hidden.

At the end of the frame 10 opposite the boss 11, the frame is provided with a pocket 60. Directly opposite to the axis of the bore 14 and hence the axis of the cutter wheel 34, and spaced on opposite sides thereof, are a pair of small rollers 62 which are journalled on pins 63 bridging the walls defining the pockets.

Spaced equidistant from the rollers 62 and also on opposite sides of a center line through the cutter wheel, is a pair of larger rollers 65. The rollers 62 are for supporting small pipe to be cut and the rollers 65 for supporting large pipes.

In operation the pawl 25 is depressed and the tube 20 with its associate parts slid outwardly the appropriate distance. Then the cutter is placed on the tube with the rollers 62 or 65 engaging the tube. In the case of large tubes the rollers 65 will engage with the tube and in the case of smaller tubes the rollers 62 will engage, thus no adjustment of the rollers is required for the size of the tube and a better support is provided for the larger tubes.

After the cutter is in place on the tube the knob 50, with its associated parts is simply pushed inward until the cutter engages the tube, the ratcheting parts permitting this action. Then the knob may be rotated and the threaded engagement between the threads 37b and the threads 44 in the nut 43, causing the cutter to be advanced into the work which is also accompanied by the usual swinging of the tool around the pipe.

Having thus described the invention in an embodiment thereof it will be appreciated that numerous and extensive departures may be made therefrom without departing from the spirit or scope of the invention as defined by the appended claims.

I claim:

1. A tubing cutter including a frame having a cutter supporting boss thereon, said boss having a bore therein of rectangular cross section, a cutter support tube in said bore slidably mounted therein, means to lock said tube in different longitudinally adjusted positions in said bore, said tube having a bore of rectangular cross section in one end and a bore of circular cross section in the other end and a flange separating the two bores, a cutter support member of rectangular cross section slidably disposed in the rectangular bore of said tube and carrying a cutter wheel on its end, a shaft connected to said cutter support member and extending through an opening in said flange, stop means carried by said shaft arranged to engage said flange upon movement of the shaft outward of the cutter support tube, said shaft being provided with a threaded end, a cutter shaft drive member rotatably supported in the outer end of the cutter support tube and having threads for driving engagement with said threaded shaft, said drive member having a flange exteriorly of said cutter support tube, a cap threadingly engaged with the end of the cutter support tube and having an opening therethrough, said flange arranged to engage the inner side of said cap, and a boss formed on said cutter drive member adjacent said flange, said cutter drive member being formed with a reduced extension, an operating handle secured on said extension in engagement with said boss and retainer means for retaining said handle on said extension.

2. A device as described in claim 1, wherein said handle comprises a barrel shaped member with a partition in its mid-section to provide a skirt which extends over said cap.

3. A device as described in claim 2, wherein the cap is provided with a recess outwardly of said partition and said retainer means is disposed in said recess.

References Cited in the file of this patent

UNITED STATES PATENTS

| | | |
|---|---|---|
| 680,866 | Katzki | Aug. 20, 1901 |
| 801,866 | Headson | Oct. 17, 1905 |
| 1,505,205 | Kilgour | Aug. 19, 1924 |
| 2,629,926 | Franck | Mar. 3, 1953 |
| 2,630,029 | Franck | Mar. 3, 1953 |
| 2,787,054 | Franck | Apr. 2, 1957 |

FOREIGN PATENTS

| | | |
|---|---|---|
| 24,503 | Great Britain | of 1903 |
| 779,414 | France | Jan. 14, 1935 |